US009483635B2

(12) United States Patent
Azab et al.

(10) Patent No.: US 9,483,635 B2
(45) Date of Patent: Nov. 1, 2016

(54) METHODS, SYSTEMS, AND COMPUTER READABLE MEDIUM FOR ACTIVE MONITORING, MEMORY PROTECTION AND INTEGRITY VERIFICATION OF TARGET DEVICES

(71) Applicant: North Carolina State University, Raleigh, NC (US)

(72) Inventors: Ahmed Azab, Raleigh, NC (US); Peng Ning, Cary, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 14/419,222

(22) PCT Filed: Mar. 15, 2013

(86) PCT No.: PCT/US2013/000074
§ 371 (c)(1),
(2) Date: Feb. 2, 2015

(87) PCT Pub. No.: WO2014/021919
PCT Pub. Date: Feb. 6, 2014

(65) Prior Publication Data
US 2015/0199507 A1    Jul. 16, 2015

Related U.S. Application Data

(60) Provisional application No. 61/679,305, filed on Aug. 3, 2012.

(51) Int. Cl.
*G06F 11/00* (2006.01)
*G06F 21/50* (2013.01)
(Continued)

(52) U.S. Cl.
CPC .......... *G06F 21/50* (2013.01); *G06F 11/3024* (2013.01); *G06F 21/53* (2013.01); *G06F 11/3089* (2013.01); *G06F 2201/815* (2013.01); *G06F 2221/034* (2013.01)

(58) Field of Classification Search
CPC ............................... G06F 21/50; G06F 21/60
USPC ......................................................... 726/22
See application file for complete search history.

(56) References Cited

U.S. PATENT DOCUMENTS 7,149,862 B2    12/2006 Tune et al.
8,712,407 B1 *   4/2014 Cope ...................... H04W 4/00
                                                455/41.1
(Continued)

OTHER PUBLICATIONS

Notification of Transmittal of the International Search Report and the Written Opinion of the International Searching Authority, or the Declaration for International Application No. PCT/US2013/000074 (Jan. 28, 2014).

(Continued)

*Primary Examiner* — Anthony Brown
(74) *Attorney, Agent, or Firm* — Jenkins, Wilson, Taylor & Hunt, P.A.

(57) ABSTRACT

Methods, systems, and computer readable media for active monitoring, memory protection, and integrity verification of a target device are disclosed. For example, a normal world virtual processor and a secure world virtual processor are instantiated on a target device. A target operating system is executed on the normal world virtual processor. An integrity verification agent is executed on the secure world virtual processor. One or more predetermined operations attempted on the normal world virtual processor are trapped to the secure world virtual processor. The integrity verification agent is used to determine the effect of the execution of the trapped operations on the target device.

33 Claims, 1 Drawing Sheet

| 15 | 14 | 13 | 12 | 11 | 10 | 9 | 8 | 7 | 6 | 5 | 4 | 3 | 2 | 1 | 0 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 0 | 1 | 1 | 1 | 0 | opc1 ||| 0 | CRn |||| Rt |||| coproc |||| opc2 ||| 1 | CRm ||||

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| cond |||| 1 | 1 | 1 | 0 | opc1 ||| 0 | CRn |||| Rt |||| coproc |||| opc2 ||| 1 | CRm ||||

(51) Int. Cl.
*G06F 21/53* (2013.01)
*G06F 11/30* (2006.01)

(56) References Cited

U.S. PATENT DOCUMENTS

| | | |
|---|---|---|
| 2004/0158727 A1 | 8/2004 | Watt et al. |
| 2007/0226795 A1 | 9/2007 | Conti et al. |
| 2008/0092145 A1 | 4/2008 | Sun et al. |
| 2009/0049220 A1 | 2/2009 | Conti et al. |
| 2010/0031360 A1 | 2/2010 | Seshadri et al. |
| 2012/0066766 A1 | 3/2012 | Yodaiken |
| 2012/0216281 A1 | 8/2012 | Uner et al. |

OTHER PUBLICATIONS

Garfinkel et al., "Terra: A Virtual Machine-Based Platform for Trusted Computing," SOSP '03, (Oct. 2003).
ARM Security Technology, "Building a Secure System using TrustZone Technology," ARM Whitepaper, ARM Limited (2009).

* cited by examiner

METHODS, SYSTEMS, AND COMPUTER READABLE MEDIUM FOR ACTIVE MONITORING, MEMORY PROTECTION AND INTEGRITY VERIFICATION OF TARGET DEVICES

PRIORITY CLAIM

This application claims the benefit of U.S. Provisional Patent Application Ser. No. 61/679,305, filed Aug. 3, 2012; the disclosure of which is incorporated herein by reference in its entirety.

GOVERNMENT INTEREST

This invention was made with government support under Grant Nos. 0910767 awarded by the National Science Foundation and W911 NF-08-1-0105 and 528787 awarded by the Army Research Office. The government has certain rights in this invention.

TECHNICAL FIELD

The subject matter described herein relates to computer system security. More particularly, the subject matter described herein relates to methods, systems, and computer readable medium for active monitoring, memory protection, and integrity verification of target devices.

BACKGROUND

The damage and loss caused by attacks and security breaches have drawn attentions to develop secure and reliable systems for computing platforms, including mobile and embedded systems.

Computer attacks and security breaches can seriously impact target devices by performing unauthorized modification to the operating system (OS) kernel or critical programs, like user processes or system management daemons, which run inside the target system. In particular, modifying the OS kernel could allow malicious attackers to have an unlimited access to the whole system.

These challenges present a need for developing unconventional solutions that are well isolated from the running OS yet capable of actively monitoring the target system, including the kernel, and provide the needed memory protection to guarantee its integrity.

SUMMARY

Methods, systems, and computer readable media for active monitoring, memory protection, and integrity verification of software programs that run on a target device are disclosed. According to one method, a normal world virtual processor and a secure world virtual processor are instantiated on a target device. A target operating system is executed on the normal world virtual processor. An integrity verification agent is executed on the secure world virtual processor. Predetermined operations attempted on the normal world virtual processor are trapped to the secure world virtual processor. The integrity verification agent is used to determine the effect of the execution of the trapped operations on the target device.

According to one system, the system includes a normal world virtual processor and a secure world virtual processor configured to execute on a target device. The system also includes an integrity verification agent configured to execute on the secure world virtual processor. The system further includes a target operating system that executes on the normal world virtual processor. The normal world virtual processor is configured to trap to the one or more predetermined operations attempted on the normal world virtual processor. The secure world virtual processor is configured to use the integrity verification agent to determine the effect of execution of the trapped operations on the target device.

The subject matter described herein for active monitoring, memory protection and integrity verification of target devices may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figures 1, 2:
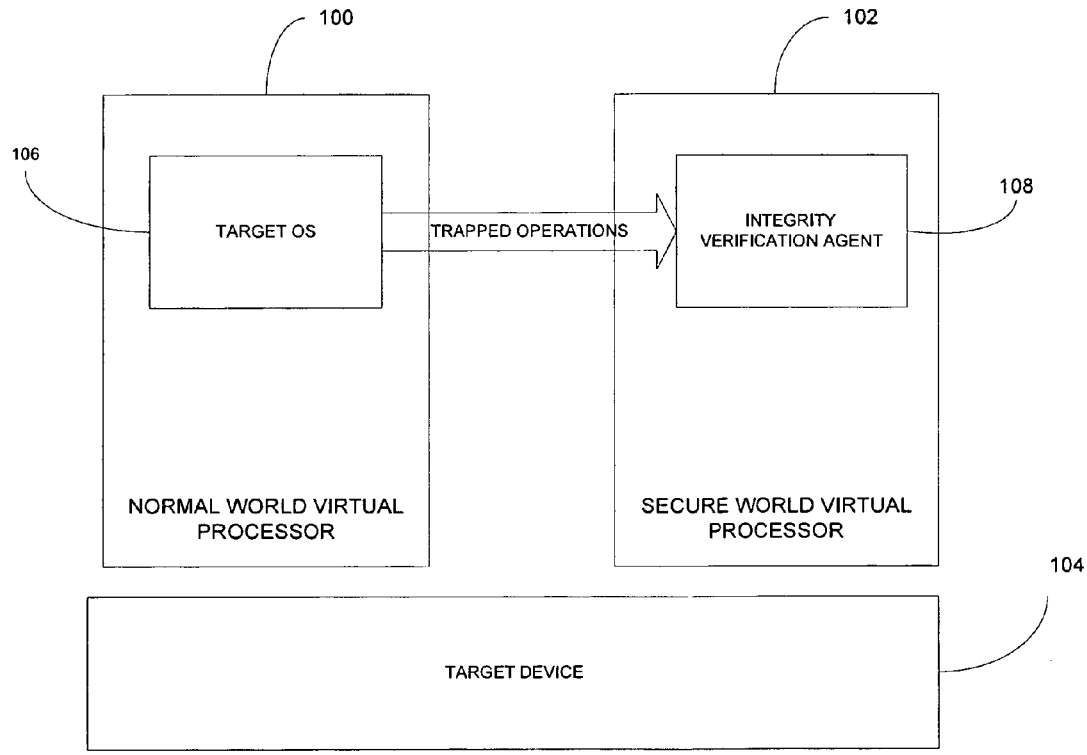
FIG. 1 is a block diagram of sample encoding of an MCR instruction.
FIG. 2 is a block diagram a system for active monitoring and memory processing of a target device according to an embodiment of the subject matter described herein.

We have novel techniques and mechanisms that can address these challenges. Aspects of the subject matter described herein may provide a hardware-based isolation between a normal world virtual processor and a secure world normal processor. Certain processor architectures, such as the ARM architecture provided by ARM Holdings plc, provide such isolation. In ARM, this feature is known as the ARM TrustZone technology. ARM's TrustZone technology enables hardware-based isolation to separate the code execution on a single physical processor core into two worlds, "the secure world" and "the normal world" (or "the non-secure world"). The secure world is intended for security sensitive operations, while the normal world is intended for other operations.

In some embodiments, we place the target operating system to be protected in the normal world, and our trusted components into the secure world. This arrangement may be implemented on a variety of architectures. Although some aspects of the subject matter described herein use the ARM TrustZone architecture, it will be understood that methods and techniques described herein can be implemented on other processor architectures, now known or later developed.

The target operating system in principle can be any operating system, such as Android, embedded Linux, NetBSD, or any other OS now known or later developed. In some embodiments, the target operating system may include a kernel that is responsible for managing the device resources. In some embodiments, the code of the OS kernel may execute in a "privileged mode" and may be allowed to execute privileged instructions and security critical operations.

In some embodiments, the target device may have multiple user processes and/or daemons that execute in an unprivileged "user mode" and may not be allowed to execute privileged instructions and security critical operations.

In some embodiments, one or more predetermined operations, such as security critical operations and privileged instructions, attempted on the normal world virtual processor are trapped to the secure world virtual processor. For example, trapping a security critical operation or a privileged instruction may include switching the execution context from the normal world virtual processor to the secure world virtual processor. In this example, the security critical operation or privileged instruction may be executed by the integrity verification agent running in the secure world rather than the target operating system running in the normal world.

In some embodiments, an integrity verification agent may be used to determine the effect of the execution of the trapped operations on the target device.

In some embodiments, the target OS running on the normal world virtual processor may be modified so that it is not capable of executing predetermined security critical operations or privileged instructions without trapping the predetermined operations or instructions to the integrity verification agent running on the secure world virtual processor. For example, the target operating system kernel may be modified so that all the privileged instructions are removed from its executable binary. For example, security privileged instructions include, but are not limited to, instructions that control the Memory Management Unit (MMU) of the target device.

In some embodiments, the modified executable binary may be marked as read-only to avoid potentially malicious modification, e.g., an unauthorized instruction to add privileged instructions back into the binary.

In some embodiments, a method in accordance with aspects of the subject matter described herein may include that the target operating system's unprivileged programs (e.g., user processes) are memory mapped as "privileged-execute never", so they are not allowed to execute privileged instructions even if they are maliciously modified.

In some embodiments, modifying the normal world OS may be done by using any of the known techniques of directly modifying its source code, modifying its executable binary, or using binary translation.

In some embodiments, a method in accordance with aspects of the subject matter described herein may further include using memory access protection to prevent the target operating system from gaining the required memory access to execute security critical operations. For example, security critical operations may include, but are not limited to, modifying the page tables that define the memory mapping of the system or modifying the Direct Memory Access (DMA) controller. The DMA controller may determine which memory is accessible by peripheral devices. Attacks may try to exploit the DMA controller so as to use peripheral devices to modify the code or data of the normal world virtual processor.

In some embodiments, a method in accordance with aspects of the subject matter described herein may include detecting an integrity violation of the target device when the integrity verification agent detects an attempt to execute a privileged instruction or a security critical operation that violates a predetermined policy. For example, the policy may include, but is not limited to, not allowing modifications to the executable binaries of the normal world OS, disabling the memory access protection of the normal world OS, or modifying a read-only critical data structures of the normal world OS.

Technical Capabilities

Our main goal is to prevent security attacks that attempt to modify the target device, or portion therein, such as a normal world operating system.

In some embodiments, aspects of the subject matter described herein may comprise techniques and/or methods for detection of malicious attacks by generating an up-to-date report about the integrity status of the normal world operating systems.

In some embodiments, aspects of the subject matter described herein may comprise techniques and/or methods may comprise preventing instructions and/or operations that may result in compromising the integrity of the normal world operating system before they are executed.

In some embodiments, aspects of the subject matter described herein may comprise techniques and/or methods for detection or prevention of malicious attacks or a combination of both.

To achieve these objectives, aspects of the subject matter described herein may provide methods, modules, and/or devices that include one or more of the following capabilities:

1) Active monitoring of normal world critical events, including security-critical operations and privileged instructions, and recognizing their impact on the state of the normal world operating systems.
2) Full control over the normal world memory layout so that the secure world can affirm that verified normal world programs cannot be manipulated after it is loaded and that unverified normal world programs will not be able to execute privileged instructions or security critical operations. We denote this capability as "memory protection"
3) Integrity verification that may be based on a predetermined security policy. The input events used to verify if one or more security policies is violated or not can result from the (mentioned above) active monitoring and/or the memory protection.

Assumptions

In some embodiments, the integrity verification (measurement) agent may execute as a part of the secure world, while the target operating system runs or executes in the normal world.

In some embodiments, the secure world may do load-time verification of the normal world kernel through calculating the checksum of the loaded binary (this process is widely known as static measurement).

In some embodiments, the load-time verification may also extend to verify that the normal world kernel is properly modified for our intended protection by removing all privileged instructions from its binaries.

The idea of using an isolated or protected component to verify a general purpose system is described in Grafinkel et al., "Terra: A Virtual Machine-Based Platform for Trusted Computing," SOSP (2003), the disclosure of which is incorporated herein by reference in its entirety. Intuitively, static measurement only guarantees the integrity of the normal world kernel during the boot-up process, but it cannot guarantee the integrity of the kernel after the system boots and starts to interact with potential attackers.

In some embodiments, the OS kernel is the only software executing privileged instructions on the normal world virtual processor. Furthermore, the kernel may not rely on mixed writable and executable pages. Through our experimental evaluation, we found that many of the recent versions of OS kernels (e.g., Android and Linux) follow this assumption by separating executable code from writable data.

Threat Model:

In some embodiments, a method in accordance with aspects of the subject matter described herein considers all attacks that aim to stealthily execute code inside the normal world operating system. In this context, stealthily means that the code would be executed without updating the integrity verification agent that runs in the secure world. Such attacks can be done either by loading new unverified code binaries or by modifying code binaries that were previously mapped and already exist in memory. We design our system to handle both cases.

In some embodiments, a method in accordance with aspects of the subject matter described herein may further consider all attacks that aim to modify security critical data inside the normal world operating system. In this context, the security-critical data should be predefined for the integrity verification agent to monitor its modification.

Attackers can use any existing system vulnerability to hack into the normal world operating system, including kernel vulnerabilities that will allow them to control the normal world kernel. We guarantee that our system should detect and/or prevent any of these vulnerabilities, given that they involve loading new code or modifying existing code.

Nevertheless, there is a special type of attacks that does not require modifying or loading code, which is the return-oriented attack. Although our system cannot detect return-oriented attacks because they solely rely on data vulnerabilities, we guarantee that these attacks will not subvert our active monitoring and memory protection framework by loading new programs (e.g., malicious apps) without being measured by the integrity measurement agent in the secure world.

Technical Challenges of Active Monitoring and Memory Protection in TrustZone-Based Systems In some embodiments, one exemplary design of our system is based on ARM TrustZone. Despite the fact that this gives stronger hardware-based protection, it limits its capabilities of closely controlling the measurement target (the normal world operating system). In the following, we discuss the main challenges and limitations that face implementing an active monitoring and memory protection in embodiments that use ARM TrustZone-based integrity monitoring.

1. Memory protection provided by TrustZone: The main purpose of the TrustZone technology is to create a hardware isolated environment that prevents security critical assets (secure world memory and peripherals) from being accessed by the normal world. However, such isolation in principal gives either one of the two worlds full control over its own resources. Thus, the normal world kernel has full control of its assigned physical memory, which includes fully configuring the Memory Management Unit (MMU) and assigning access permissions (e.g., read-only, writable, executable) to its mapped memory pages. Intuitively, such architecture introduces challenges for secure world components to monitor and protect critical memory regions that belong to the normal world.

2. Interrupts and exception handling in TrustZone: Although TrustZone allows the secure world to select a set of events that would be handled by the secure world. These events are limited to external interrupts (IRQs or FIQs) and certain type of exceptions (e.g., external data aborts). However, other types of exceptions and critical events (e.g., regular data abort exceptions, or the supervisor mode calls used for system calls) cannot be configured to trap to the secure world and are handled directly by the normal world. Intuitively, such events could have an impact on the integrity status of the normal world. If these events are not trapped by the secure world, such impact on integrity can go unnoticed by the integrity monitoring agent.

The Proposed Technique

Aspects of the subject matter described herein allow active monitoring of the normal world by trapping critical events into the secure world. Moreover, we use this active monitoring technique to possess control over the virtual memory mapping of the normal world so that it can provide full protection of the normal world memory using virtual memory access permission flags.

Before we present our technique, we give a quick background on three architectural principles of ARM v7 processors that are relevant to embodiments that implement aspects of the subject matter described herein on the ARMv7 architecture. As mentioned previously, it will be understood that the methods and techniques herein can be implemented on any processor architectures other than the ARM v7 used in this exemplary design, now known or later developed.

ARM coprocessor support: ARM v7 architecture supports coprocessors, to extend the functionality of an ARM v7 processor. The coprocessor instructions provide access to sixteen coprocessors (0 to 15). Coprocessor 15 (CP15) provides system control registers that control most processor and memory system features (e.g., the MMU, interrupt vector handler, caching, performance models).

Controlled access to the CP15 coprocessor: Accessing ARM v7 CP15 for read and write can be done through special commands (e.g., MCR and LDC). This is restricted so that it only occurs from privileged software (i.e., kernel code). Moreover, ARM v7 virtual memory system architecture can specify that only a defined set of memory pages are allowed to execute in the privileged mode using the Privileged Non eXecute (PXN) access permission.

Aligned native code: ARM instruction set (either thumb or arm) consists of native code that consists of a sequence of 32-bit or 16-bit aligned single binary instructions. Each binary instruction incorporates the opcode and the operands in one 32-bit or 16-bit binary word.

Our active monitoring can be summarized in the following basic principles:

The normal world is initialized so that it only allows certain memory ranges (defined by virtual memory access control) to execute privileged code.

In some embodiment, this may be done by loading a trusted preconfigured initial image of the normal world.

In some embodiments, these privileged memory pages are marked non-writable and are carefully inspected so that they do not contain any single instruction that does certain privileged operations (for example, instructions that modify critical registers in the CP15 of ARM v7 architecture), it will not be possible for the normal world to run these instructions. Consequently, the normal world kernel will not be able to modify the processor functionalities that are controlled by these instructions (for example, functionalities that are controlled by specific critical CP15 registers of the ARM v7 architecture).

In some embodiments, these critical instructions collectively may be the only method for controlling the virtual memory access control of the normal world virtual process.

An exemplary implementation of the active monitoring and memory protection framework will be implemented using one or more of the following steps:

1. After initializing the target device, the virtual memory map of the normal world may be configured (either by the normal world or the secure world) so that privileged code pages, which include the interrupts and exceptions handling vectors, are marked non-writable.
2. All other normal world mapped pages that either belongs to the kernel or user processes may be marked as PXN pages so that even if they are modified later, they are never allowed to execute privileged instructions (for example those that access specific security-critical registers of the ARM v7 CP15) that modify the status of the normal world.
3. All page tables, which are used to define the normal world memory layout and access control, may be marked non-writable. Thus, any modifications to the page tables will cause a data abort exception. In some embodiments, these page tables may be pointed to by the ARM v7 CP15 Translation Table Base Registers (TTBRs), or any other register with similar functionality on other architectures.
4. The non-writable kernel pages may be modified so that a call to the secure world virtual processor (for example a Secure Monitor Call (SMC) instruction) replaces security critical operations and privileged instructions (e.g., data abort exception handler, instruction abort handler, writes to page tables, and CP15 register writes). Hence, all these security critical operations and privileged instructions will be handled by the secure world.
5. The secure world may inspect critical events and forward them to the integrity measurement agent to evaluate their impact on the integrity status of the system. In the case that the trapped event is a page table write, the secure world will do the required page table modification on behalf of the normal world kernel after affirming that it does not violate the predetermined security policy or revert any of the operations defined by steps 1-4 (In some embodiment, the predetermined security policy may include prohibiting giving write access to original kernel pages or any page tables. It may also prevent mappings of privileged executable pages).
6. In some embodiments, the integrity verification agent may use a computer readable medium (for instance volatile or non-volatile memory) to store information about the status of the normal world memory map and/or any required security police. In an example implementation, the integrity verification agent may store a bitmap that marks the status of every page of the normal world so that it can detect id writes to this page (or changing its memory mapping in the corresponding page table entries) would violate any security police or not.

These steps may allow the proposed system to achieve both active monitoring of the normal world kernel and normal kernel memory protection. Steps 1 and 2 prevent any potentially malicious software running inside the normal world from executing privileged instruction either by mapping the instructions in the memory or by modifying any of the privileged already-mapped instructions. The fact that ARM native code only consists of 32-bit or 16-bit instructions makes it feasible to scan the executable privileged pages word by word and affirm that none of the instructions would access a critical register.

In some embodiments that use the ARM v7 architecture, FIG. 1 shows a sample encoding of the MCR instructions that is used to write to a CP register. The CP registers are defined by the CP number and four other parameters: CRn, CRm, opc1, and opc2. If all 32-bit (aligned) values of the privileged executable pages are inspected so that no instruction would match an MCR to this specific register, we can guarantee that this register will never be modified by the normal world. The critical registers that we target are particularly those that disable the MMU, relocate the interrupt vector handler, or relocate the base address of the virtual addressing translation tables.

Step 3 guarantees memory protections. In some embodiments that use the ARM v7 architecture, the TTBRs, which point to the base of page tables, are part of CP15. TTBRs will be marked among those registers that are prohibited to be modified by the normal world kernel (as mentioned in step 2). Thus, the normal world will be restricted to use a specific physical memory as the page tables. The initialization code will map this physical memory (the page tables) non-writable. Hence any page table updates will cause a data abort. Since all data abort exceptions will be trapped to the secure world (as discussed in step 4), all page table modifications will be inspected by the secure world before actually taking effect in the normal world.

Step 4 guarantees the required active monitoring. In some embodiments that use the ARM v7 architecture, critical events, such as modifying a TTBR value to context switch between user processes, are going to be impossible to execute in the normal world. Thus, the only way to execute this functionality correctly is for the normal world kernel to call the "SMC" instruction and let the critical operation be handled by the secure world. The security of this operation is supported by the fact that both CP register writes and "SMC" calls are atomic operations that consist of a single instruction. At the same time, all integrity checks (e.g., verifying that the new page tables does not have writable privileged pages) are done by the secure world, which is out-of-reach of the normal world. Even a kernel subverted by a return-oriented attack will not be able to modify critical status by jumping through the middle of composite code and skip potential normal world integrity verification.

Finally, implementing step 5 means that the secure world will be the single point of integrity verification that guarantees that the active monitoring capabilities will remain in effect for the lifetime of the system. By implementing proper integrity checks on privileged operations, such as verifying page tables of newly mapped processors and verifying that the MMU or virtual page access control protections are not disabled, the secure world will guarantee that both memory protection and active monitoring are in place for the normal world.

FIG. 2 is a block diagram illustrating a system for active monitoring and memory protection of a target device according to an embodiment of the subject matter described herein. In FIG. 2, the system includes a normal world virtual processor 100 and a secure world virtual processor 102 on a target device 104. Normal world virtual processor 102 and secure world virtual processors may each be ARM TrustZone virtual processors, as described in ARM Security Technology, Building a Secure System using TrustZone Technology, ARM Whitepaper, ARM Limited (2009); the disclosure of which is incorporated herein by reference in its entirety. Target device 104 may be any computing platform on which isolation can be achieved using normal and secure world virtual processors. Examples of such computing platforms include servers, desktop computers, mobile devices, such as smart phones, PDAs, or tablet computers or embedded systems, which may include a processor and associated memory embedded in an appliance or industrial device, such as a power or water meter.

As set forth above, a target operating system 106 is executed on normal world virtual processor 100 and an integrity verification agent 108 is executed on secure world virtual processor 102. The execution of certain critical operations is trapped to secure world virtual processor 102. Examples of trapped operations include regular data abort exceptions or supervisory mode calls used for system calls. The trapped operations are executed on secure world virtual processor 102. Integrity verification agent 108 monitors execution of the trapped operations on secure world virtual processor 102 to evaluate effects of the execution of the trapped operations on integrity of target device 104.

For example, target device 104 may be a smart phone and the user may switch between a voice call and an email application. In such a situation, target OS 106 may write a new value to the processor control register, CP15, to switch between processes. As stated above, attempted writes to CP15 are trapped and passed to integrity verification agent 108 for verification. Integrity verification agent 108 may examine the value being written to CP15. In this instance, the value may be the process ID or memory location for the email application. To validate the process ID, integrity verification agent 108 may search a list of allowed processes to see whether the email application is permitted to execute. In this instance, it is assumed that the email application is permitted to execute and secure world virtual processor 102 may allow the email application to execute.

In another example, the memory location or process ID attempted to be written to CP15 may corresponding to malware, which would not be in the list of permitted applications. In such a situation, secure world virtual processor 102 may prevent the malware from executing. It should also be noted that integrity verification agent 108 may consult with an external system to verify an application or process, for example, using a cryptographic signature of the application.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for active monitoring, memory protection, and integrity verification of a target device, the method comprising:
   instantiating a normal world virtual processor and a secure world virtual processor on a target device, wherein instantiating the normal world virtual processor includes creating a virtual memory map of the normal world virtual processor that defines the memory access protection of privileged code pages as non-writable;
   executing a target operating system on the normal world virtual processor;
   executing an integrity verification agent on the secure world virtual processor;
   trapping one or more predetermined operations attempted on the normal world virtual processor to the secure world virtual processor; and
   using the integrity verification agent to determine the effect of execution of the trapped operation of the target device.

2. The method of claim 1, wherein the trapped one or more predetermined operations include a security critical operation, a privileged instruction, an instruction operable to disable or modify the virtual memory access protection provided by the Memory Management Unit (MMU) of the normal world virtual processor, an instruction operable to modify one or more predetermined registers associated with a processor or a coprocessor of the target device, an instruction operable to modify code or critical read-only data associated with the target device, an instruction operable to modify a direct memory access (DMA) controller associated with the target system, a regular data abort exception, or a supervisory mode call used for system calls.

3. The method of claim 1, wherein the trapped one or more predetermined operations include an instruction operable to disable, modify, or mitigate the integrity verification agent of the target operating system.

4. The method of claim 1, wherein the secure world virtual processor is isolated and protected from the normal world virtual processor.

5. The method of claim 1, wherein code and data of the secure world virtual processor are not accessible by the normal world virtual processor.

6. The method of claim 1, wherein code and data of the normal world virtual processor are accessible by the secure world virtual processor.

7. The method of claim 1, where the privileged code page includes an interrupt handling vector or an exceptions handling vector.

8. The method of claim 1, wherein the virtual memory map of the normal world virtual processor defines the memory access protection of un-privileged code pages as "privileged execute never (PXN)" so that the one or more un-privileged code pages are prohibited from executing a privileged instruction or security critical operation executable by the privileged code page.

9. The method of claim 1, wherein trapping the one or more predetermined operations to the secure world virtual processor includes switching the execution context from the normal world virtual processor to the secure world virtual processor so that the operation is executed by the integrity verification agent running in the secure world rather than the target operating system running in the normal world.

10. The method of claim 1, comprising modifying the target operating system of the normal world virtual processor so that the one or more predetermined operations are replaced with calls that trap to the secure world virtual processor and wherein trapping the security critical operations includes trapping attempted writes to a privileged code page.

11. The method of claim 10, wherein modifying the target operating system of the normal world virtual processor includes modifying its source code, modifying its executable binary, or binary translation.

12. The method of claim 1, comprising performing a static integrity check of the target operating system.

13. The method of claim 1, wherein using the integrity verification agent to determine the effect of execution of the trapped operation of the target device includes performing a mitigation action.

14. The method of claim 13, wherein the mitigation action includes denying execution of the trapped operation, issuing a security warning, or shutting down the target device.

15. The method of claim 14, wherein the integrity verification agent uses a security policy and wherein performing the mitigation action occurs in response to the trapped operation being operable to violate the security policy.

16. The method of claim 1, wherein the target device comprises a computing platform, a smart phone, a PDA, a tablet computer, or an embedded system.

17. A system for active monitoring and memory protection of a target device, the system comprising:
 a target device containing at least one physical processor;
 a normal world virtual processor and a secure world virtual processor configured to execute on the target device;
 an integrity verification agent configured to execute on the secure world virtual processor; and
 wherein a target operating system executes on the normal world virtual processor, wherein the target operating system is configured to creating a virtual memory map of the normal world virtual processor that defines the memory access protection of privileged code pages as non-writable, and wherein the normal world virtual processor is configured to trap to the secure world virtual processor one or more predetermined operations attempted on the normal world virtual processor and wherein the secure world virtual processor is configured to use the integrity verification agent to determine the effect of execution of the trapped operations on the target device.

18. The system of claim 17, wherein the trapped one or more predetermined operations include a security critical operation, a privileged instruction, an instruction operable to disable or modify the virtual memory access protection provided by the Memory Management Unit (MMU) of the normal world virtual processor, an instruction operable to modify one or more predetermined registers associated with a processor or a coprocessor of the target device, an instruction operable to modify code or critical read-only data associated with the target device, an instruction operable to modify a direct memory access (DMA) controller associated with the target system, a regular data abort exception, or a supervisory mode call used for system calls.

19. The system of claim 17, wherein the trapped one or more predetermined operations include an instruction operable to disable, modify, or mitigate the integrity verification agent of the target operating system.

20. The system of claim 17, wherein the secure world virtual processor is isolated and protected from the normal world virtual processor.

21. The system of claim 17, wherein code and data of the secure world virtual processor are not accessible by the normal world virtual processor.

22. The system of claim 17, wherein code and data of the normal world virtual processor are accessible by the secure world virtual processor.

23. The system of claim 17, where the privileged code page includes an interrupt handling vector or an exceptions handling vector.

24. The system of claim 17, wherein the virtual memory map of the normal world virtual processor is configured to define the memory access protection of un-privileged code pages as "privileged execute never (PXN)" so that the one or more un-privileged code pages are prohibited from executing a privileged instruction or security critical operation executable by the privileged code page.

25. The system of claim 17, wherein the target operating system is configured to trap the one or more predetermined operations to the secure world virtual processor by switching the execution context from the normal world virtual processor to the secure world virtual processor so that the operation is executed by the integrity verification agent running in the secure world rather than the target operating system running in the normal world.

26. The system of claim 17, wherein the target operating system is modified so that the one or more predetermined operations are replaced with calls that trap to the secure world virtual processor and wherein trapping the security critical operations includes trapping attempted writes to a privileged code page.

27. The system of claim 26, wherein the target operating system is modified by modifying its source code, modifying its executable binary, or binary translation.

28. The system of claim 17, comprising performing a static integrity check of the target operating system.

29. The system of claim 17, wherein the integrity verification agent is configured to perform a mitigation action.

30. The system of claim 29, wherein the mitigation action includes denying execution of the trapped operation, issuing a security warning, or shutting down the target device.

31. The system of claim 30, wherein the integrity verification agent uses a security policy and wherein performing the mitigation action occurs in response to the trapped operation being operable to violate the security policy.

32. The system of claim 17, wherein the target device comprises a computing platform, a smart phone, a PDA, a tablet computer, or an embedded system.

33. A non-transitory computer readable medium having stored thereon executable instructions that when executed by the processor of a computer controls the computer to perform steps, the steps comprising:
 instantiating a normal world virtual processor and a secure world virtual processor on a target device, wherein instantiating the normal world virtual processor includes creating a virtual memory map of the normal world virtual processor that defines the memory access protection of privileged code pages as non-writable;
 executing a target operating system on the normal world virtual processor;
 executing an integrity verification agent on the secure world virtual processor;
 trapping one or more predetermined operations attempted on the normal world virtual processor to the secure world virtual processor; and
 using the integrity verification agent to determine the effect of execution of the trapped operation of the target device.

* * * * *